(12) United States Patent
Xu (10) Patent No.: US 12,380,720 B2
(45) Date of Patent: Aug. 5, 2025

(54) METHOD, APPARATUS, AND SYSTEM FOR CHARACTER RECOGNITION USING CONTEXT

(71) Applicant: KONICA MINOLTA BUSINESS SOLUTIONS U.S.A., INC., Foster City, CA (US)

(72) Inventor: Ting Xu, Campbell, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 319 days.

(21) Appl. No.: 18/092,005

(22) Filed: Dec. 30, 2022

(65) Prior Publication Data

US 2024/0221408 A1 Jul. 4, 2024

(51) Int. Cl.
*G06V 30/00* (2022.01)
*G06V 10/82* (2022.01)
*G06V 30/19* (2022.01)

(52) U.S. Cl.
CPC ........ *G06V 30/19173* (2022.01); *G06V 10/82* (2022.01)

(58) Field of Classification Search
CPC .. G06V 30/19173; G06V 10/82; G06V 30/10; G06V 30/18057
See application file for complete search history.

(56) References Cited

U.S. PATENT DOCUMENTS

| | | | |
|---|---|---|---|
| 9,047,528 B1 | 6/2015 | Guha et al. | |
| 9,082,035 B2 | 7/2015 | Hwang et al. | |
| 9,189,708 B2 | 11/2015 | Fujii | |
| 2013/0044943 A1 | 2/2013 | Tuganbaev | |
| 2023/0368557 A1* | 11/2023 | Kolavennu | G06F 18/23 |

FOREIGN PATENT DOCUMENTS

| | | |
|---|---|---|
| CN | 106598920 A | 4/2017 |
| JP | 2017194806 A | 10/2017 |

OTHER PUBLICATIONS

Wan et al, Research on Scene Chinese Character Recognition Method Based on Similar Chinese Characters, 2nd International Conference on Machine Learning, Big Data and Business Intelligence (MLBDBI), pp. 459-463 (Year: 2020).*
Katti et al, Chargrid: Towards Understanding 2D Documents, arXiv:1809.08799v1 (Year: 2018).*

(Continued)

*Primary Examiner* — Xiao Liu
(74) *Attorney, Agent, or Firm* — SQUIRE PATTON BOGGS (US) LLP (57) ABSTRACT

A neural network-based optical character recognition (OCR) method, system, and apparatus may use context provided by a neural network-based language model (LM) to improve character recognition in images. In embodiments, a fuzzy OCR system receives an input image and uses aggregated classes of visually similar characters to identify a most probable aggregated class of visually similar characters. That aggregated class is used as an input to the LM, which, in embodiments, employs a portion of text, for example a word, a phrase, a sentence, or a paragraph, from the input image to provide sufficient context to identify the correct character from the aggregated class of visually similar characters.

20 Claims, 5 Drawing Sheets

(56) References Cited

OTHER PUBLICATIONS

Denk et al, BERTgrid: Contextualized Embedding for 2D Document Representation and Understanding, arXiv:1909.04948v2 (Year: 2019).*

Chiang et al, Hybrid Fuzzy-Neural Systems in Handwritten Word Recognition, IEEE Transactions on Fuzzy Systems, vol. 5, No. 4, Nov. 1997 (Year: 1997).*

Notice of Reasons for Refusal dated Feb. 12, 2025 issued in corresponding Japanese Patent Application No. 2023-218190 with English language translation thereof.

Decision of Refusal dated Jun. 3, 2025 issued in corresponding Japanese Patent Application No. 2023-218190, with English language translation thereof.

* cited by examiner

| Class | Aggregated class | |
|---|---|---|
| 1 | 女 | |
| 2 | 子 | |
| 3 | 生 | |
| 4 | 名 | |
| 5 | 学 | 字 |
| 6 | 好 | 女子 |
| 7 | 姓 | 女生 |

FIG. 2B

| Text of input images | Class | Aggregated Class | Fuzzy Ground truth |
|---|---|---|---|
| 女子学生 | 1, 2, 5, 3 | 1, 2, 5, 3 | 6, 5, 3 |
| 好学生 | 6, 5, 3 | 6, 5, 3 | 6, 5, 3 |
| 姓名 | 7, 4 | 7, 4 | 7, 4 |
| 女生名 | 1, 3, 4 | 1, 3, 4 | 7, 4 |
| 好名字 | 6, 4, 8 | 6, 4, 5 | 6, 4, 5 |
| 好女子 | 6, 1, 2 | 6, 1, 2 | 6, 6 |
| 好好 | 6, 6 | 6, 6 | 6, 6 |

METHOD, APPARATUS, AND SYSTEM FOR CHARACTER RECOGNITION USING CONTEXT

CROSS-REFERENCE TO RELATED APPLICATION

Aspects of the present application are related to U.S. application Ser. No. 17/364,641, filed Jun. 30, 2021, entitled "Handwriting Recognition Method and Apparatus Employing Content Aware and Style Aware Data Augmentation". The present application incorporates by reference the entire contents of the just-identified application.

FIELD OF THE INVENTION

Aspects of the present invention relate to character recognition, not limited to handwriting recognition, and more particularly to optical character recognition (OCR). Still further, aspects of the present invention relate to character recognition employing letter sequence and word context.

BACKGROUND OF THE INVENTION

In character recognition generally, depending on the way that characters are generated (handwritten, typed), on the font(s) used, on the quality of the paper on which the characters appear, and on the quality with which text containing the characters are input, characters can look quite similar to each other. As a result, words output as a result of OCR can be interpreted differently. Some interpretations may be normal; some may be nonsensical. Correct interpretation may require more than just correct character interpretation. Some characters may look similar when they are separate, or when they are put together to form another character, as for example in certain Japanese characters. Different similarly-appearing characters may mean substantially the same thing, but may have different connotations because the characters come from different historical periods.

It would be helpful to provide a way to aid in the interpretation of letters or characters appearing in words, to augment interpretation based solely on letter appearances.

SUMMARY OF THE INVENTION

In view of the foregoing, it is one aspect of the invention to provide context to letters and/or characters appearing in words which are read using an OCR system.

It is another aspect of the invention to provide training sets for language models (LM) to facilitate the learning of context and improve quality of interpretation of words in document images.

BRIEF DESCRIPTION OF THE DRAWINGS

Aspects of the invention now will be described with reference to embodiments as illustrated in the accompanying drawings, in which.

DETAILED DESCRIPTION OF EMBODIMENTS

According to embodiments of the present invention, a computer-implemented method may comprise:
- responsive to an input scanned image, performing neural network based optical character recognition (OCR) and providing OCR output comprising a plurality of output classes of visually similar characters;
- using a neural network-based language model, examining the visually similar characters within a portion of text sufficient to provide context which may be used to determine which of the visually similar characters should be output;
- responsive to the examining, outputting a selected one of the visually similar characters as recognized text.

Embodiments of the present invention also may provide a computer-implemented apparatus comprising:
- a neural network based optical character recognition (OCR) system to analyze an input scanned image and provide OCR output comprising a plurality of output classes of visually similar characters;
- a neural network-based language model to examine the visually similar characters within some portion of text sufficient to provide context which may be used to determine which of the visually similar characters should be output, and to output a selected one of the visually similar characters as recognized text.

Embodiments according to the invention as described herein provide at least the following benefits:
- Increased OCR accuracy for characters or combinations of characters that may be inherently confusing;
- Increased OCR accuracy when scan quality can affect legibility;
- Increased OCR accuracy for text that is difficult to read otherwise, whether because of a selected font or a handwriting style;
- Correct character recognition even when the author made a mistake (for example, a spelling or a grammatical error), enabling inference of the writer's intention;
- Character normalization by grouping alternate character forms, for example, Kanji (旧体, 字, 异体字), but also alphabets of the same language from different historical eras.

Embodiments according to the invention as described herein provide at least the following advantages:
- OCR engine output classes can yield probabilities with respect to aggregated classes, which are aggregations of various plausible interpretation/transcriptions, and which can consist of characters with alternative appearances which can be similar and therefore confusing;
- Each aggregated class can have one or multiple member strings (strings which may comprise characters, some of which individually are characters by themselves, or which in combination may comprise other characters);

Each member string may contain one or multiple characters;

There can be multiple aggregated classes (in an embodiment, as many as ten, sometimes more);

Aggregated classes can be designed based on reading direction (e.g. left to right, right to left, up and down), wherein different reading directions yield different character sequences and hence different design of aggregated classes;

Reduced number of output classes and possibly amount of training data based on aggregation of traditional character classes into aggregated classes, providing increased model accuracy and training convergence rate.

In an embodiment, a text recognition system may comprise a neural network based model selected from the group consisting of: a convolutional neural network (CNN), in conjunction with a bidirectional LSTM (CRNN); and a CNN in combination with a transformer neural network (CNN+transformer).

In an embodiment, the CRNN may be trained using connectionist temporal classification (CTC) loss calculation. In an embodiment, the CNN+transformer may be trained using cross-entropy loss calculation.

The following detailed description focuses on Japanese language and Japanese characters (hiragana, katakana, and Kanji), as Japanese contains a very large number of characters, and so provides many opportunities to show examples of disambiguation according to context. The description to follow contains some of these examples. Ordinarily skilled artisans will appreciate that the techniques and approaches discussed herein may be applicable and useful for virtually any alphabet and/or any language. As an example, in English, the words "naan" (a form of Indian bread) and "noon" (midday) have very different meanings. However, depending on font, handwriting style, scanning quality, and the like, the two words can look very similar, including to an OCR system. Looking at the words in a sentence can provide the kind of context necessary to differentiate the two words.

Aspects of the present invention relate to improvements in OCR accuracy by aggregating classes of characters and relying on contextual information to disambiguate recognition choices. The resulting OCR process advances from verbatim recognition to recognition in context, or "recognition by understanding".

Currently, almost all OCR software recognizes text based solely on visual appearance. As a result, inherently similar looking characters or characters that are badly printed or handwritten can cause OCR errors. The OCR software may encounter even greater difficulty when working with logographic writing systems such as Japanese and Chinese, due at least in part to the extremely large set of commonly used characters, and absence of spaces in text. Moreover, a Chinese character (or Kanji in Japanese) often consists of several parts or radicals, one or more of which could be an individual character on its own. This combinability of characters into other characters poses a unique challenge for handwritten character recognition because spaces do not exist in these languages. As a result, it well could be the case that a character may be interpreted as a multi-character sequence. The order in which characters are read also can vary, from left to right, for example, to right to left, to top to bottom, or to some combination of these. In most modern use cases, Japanese and Chinese characters are read from left to right, though reading from top-to-bottom also may occur in some situations. Consequently, some top-bottom configured kanji characters could be ambiguous in the top-to-bottom reading direction even though these same characters may not be ambiguous when read left-to-right.

Besides inherent character ambiguity, external factors can also affect OCR accuracy. A document could be badly scanned or photographed (common in fax), stained, or affected by other noise. A piece of handwritten text may become illegible depending on the writer's language fluency, rapidity of writing, size of writing area, paper/pen condition, etc.

When reading text with characters that are illegible or difficult to read, the context (words, sentences) in which the illegible characters appear can provide important clues to deciphering the characters. Accordingly, in an embodiment, recognition of individual characters may be handed off from an OCR engine to a separately trained language model (LM). In embodiments, the LM may be fine-tuned for a particular application or task, as will be discussed herein.

In embodiments, there may be more than two interpretations in a given aggregated class.

For text recognition, each character or output class in an OCR model may correspond to a particular Unicode point. See, e.g., unicode.org/charts/(Dec. 20, 2022 entry at web.archive.org). In an embodiment, Japanese language OCR may be a focus because Japanese consists of three categories of characters: hiragana, katakana, and Kanji (Chinese). Texts in Japanese also can contain ASCII characters (Roman characters, digits, punctuation, etc.). In some sense, then, Japanese can be viewed as a superset of English and Chinese. Because the design of hiragana and katakana draws inspiration from Chinese characters/radicals, there exist many confusing cases. One example is katakana "カ" (Unicode value U+30AB) and kanji "力" (Unicode value U+529B, meaning power). They may look slightly different here because of the particular font being used, but not all fonts render them differently. In addition, if the characters are handwritten it can be difficult to distinguish between them because the strokes are exactly the same. Another example is katakana "ニ" (Unicode value U+30CB) and Kanji "二" (Unicode value U+4E8C, meaning two). As it turns out, these characters are functionally identical, and are pronounced and written the same way. See, e.g., en.wikipedia.org/wiki/Ni_(kana) (Sep. 22, 2022 entry at web.archive.org).

The just-mentioned examples show potential confusion between katakana characters and Kanji characters. However, ordinarily skilled artisans will appreciate that potential confusion may exist between any two, or even all three of the categories of Japanese characters. There even may be confusion within a Japanese character category itself. Examples of potentially confused Chinese characters and potentially confused Japanese characters may be seen at the following links: wiktionary.org/wiki/Appendix:Easily_confused_Chinese_characters; (Oct. 18, 2022 entry at web.archive.org); wiktionary.org/wiki/Appendix:Easily_confused_Japanese_kana; (Oct. 18, 2022 entry at web.archive.org)

The handakuten and dakuten in hiragana and katakana often lead to OCR errors because of the small size of handakuten and dakuten relative to the characters themselves. For example, ぽ, ぽ, and ほ are different characters, but can be confusing to an OCR engine when the handakuten/dakutens are not apparent.

Aspects of the present invention can help to improve recognition accuracy for handwritten characters in various situations, either lifting the requirement that characters be "hand-printed" before scanning, or when the scan quality is not ideal (such as may be the case with faxed documents).

In handwriting recognition, often there are samples in which text may be written in a manner that is not as the writer intended. Because of a writer's language incompetency or language barrier, or simply the writer's carelessness, the actual written text may be incorrect (but may be close to the correct text). A conventional OCR engine may recognize what is actually written, though the writer may have intended otherwise. User experience will be better if the recognition system could infer the correct words.

Figure 1:
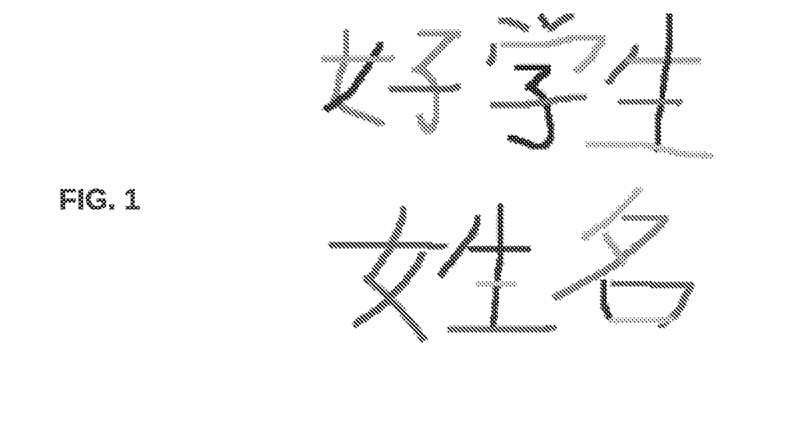
FIG. 1 shows a simple example image of input OCR text.

In FIG. 1, there are two handwritten text lines. The top line can be read as "好学生" (good student) or as "女子学生" (female student). For "female student," the two characters that make up the first character in "good student" are separated. Depending on the quality of the image scan, the two characters might be brought together, or might be kept separate. The context of the term in the sentence from which the term is taken will help to determine which reading is correct. In this particular example, it may be the case that a greater amount of context may be necessary because of the similarity in meaning of the two terms. For example, it may be helpful to provide sufficient context to determine whether student gender matters.

Also in FIG. 1, the bottom line can be read as "姓名" (full name), but also can be read as "女生名" (name of female student). For "name of female student," the two characters that make up the first character in "full name" are separated. Again, depending on the quality of the image scan, those first two characters in "name of female student" may be brought together, or may be kept separate. The context of the term in the sentence or group of words from which the term is taken will help to determine which reading is correct. Here again, it may be the case that a greater amount of context may be necessary because of the similarity in meaning of the two terms.

As a further example, in English, the words "naan" (a form of Indian bread) and "noon" (a time of day) have very different meanings. However, depending on font, handwriting style, scanning quality, and the like, the two words can look very similar, including to an OCR system. Looking at the words in a sentence can provide the kind of context necessary to differentiate the two words. Because the two words have such widely different meanings, in contrast to the good student/female student example above, less context may be necessary.

As another example, there is a character "学" that is similar to another character "字". The OCR system processing these characters easily could be confused if, for example, the upper portion of the character is written poorly or unclearly, or if noise in the OCR system makes the upper portion of both characters seem the same.

From these examples, ordinarily skilled artisans will appreciate that it is possible to take the initial recognition of a character and distill that recognition down to a limited number of choices. Final determination then can depend on the understanding of the context. Accordingly, in an embodiment, a so-called "fuzzy OCR model" recognizes text in two stages. In the first stage, a recognition model transcribes text line images (OCR models usually recognize one line of text at a time) into a sequence of aggregated classes, wherein each aggregated class contains the possible (and therefore possibly confusing) interpretations. After that, in an embodiment a separate language model may be used to disambiguate each choice in an aggregated class by utilizing contextual information (from the document itself) and/or prior information (from the larger context in which the choice appears) to generate final recognition results.

Figure 2A:
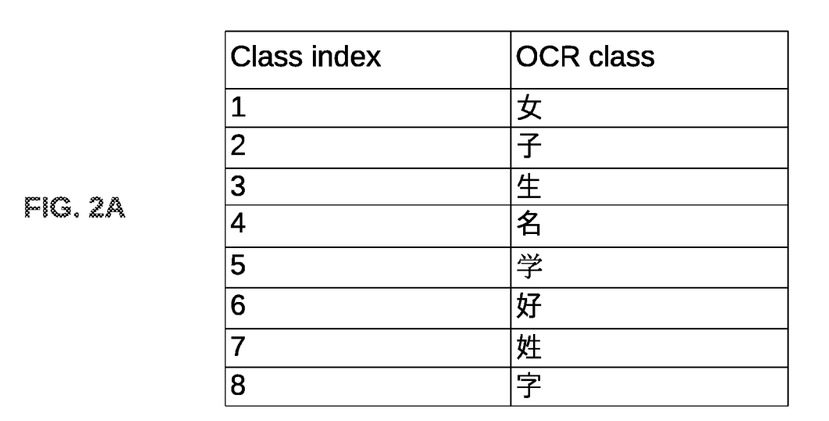
FIG. 2A shows a table of characters shown in FIG. 1 according to an embodiment.
Figure 2B:
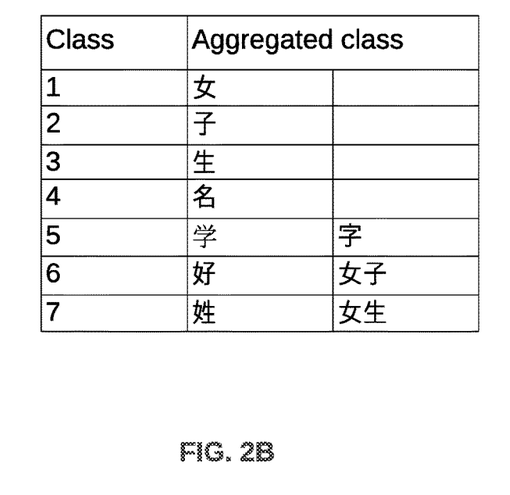
FIG. 2B shows a table of aggregated classes of characters shown in FIG. 1 according to an embodiment.

FIG. 2A contains eight distinct Individual characters. Each of these characters belongs to an output class corresponding to a Unicode value. FIG. 2B takes the distinct characters in FIG. 2A and divides them into seven classes, called aggregated classes as referred to earlier. Under the header "aggregated class," on the left hand side are individual characters. For characters in aggregated classes 1-4, there is only one representation, so those aggregated classes contain only one option, and so contain only one string, comprising a single character. For aggregated classes 5-7, there are multiple possibilities. For aggregated class 5, as noted earlier there are at least two visually similar representations, one of which is the eighth character listed in FIG. 2A. Because the fifth and eighth characters are visually similar, they are placed in the same aggregated class, class 5, which contains two strings, each with one character. For each of aggregated classes 6 and 7, there are two options, one (on the left-hand side) with characters placed together, and one (on the right hand side) with the characters placed separately. Aggregated class 6 has two strings, one with the characters placed together, and the other with the characters placed separately (corresponding to characters 1 and 2 in FIG. 2A). Aggregated class 7 also has two strings, one with the characters placed together, and the other with the characters placed separately (corresponding to characters 1 and 3 in FIG. 2A). Accordingly, each of aggregated classes 6 and 7 also has two strings, one with a single character, and one with two characters.

In another aspect, it may be appreciated that there is a long history of Kanji/Chinese characters. As a result, one or more of these characters may have evolved over time, and may have had multiple alternate forms. Meaning, usage, and pronunciation may be the same, but each variant may have a different Unicode point. For example, "戸", "戶", and "户" are three variants of the same character (all of the variants carrying the meaning "household"). The first is the most common variant that is used in Japan; the second is a less common version whose use in Japan largely is deprecated; and the third is currently used in simplified and traditional Chinese. The three variants look similar to each other, and work in the same way within the Japanese or Chinese languages. Consequently, it may be beneficial to unify the three variants into a single character class (for example, an aggregated class as in FIG. 2B, but with three alternatives), and choose the appropriate one based on language or use cases. This type of unification of Kanji characters can also reduce the number of output classes of OCR, and thus indirectly increase recognition accuracy. (Generally speaking, the larger the number of output classes, the more training samples are needed to train the underlying machine learning system. The ability to aggregate classes reduces the number of output classes, and hence reduces the number of training samples that are necessary.)

In general, there may be different numbers of members of an aggregated class, depending on how many different ways there are to interpret those members.

Figure 2C:
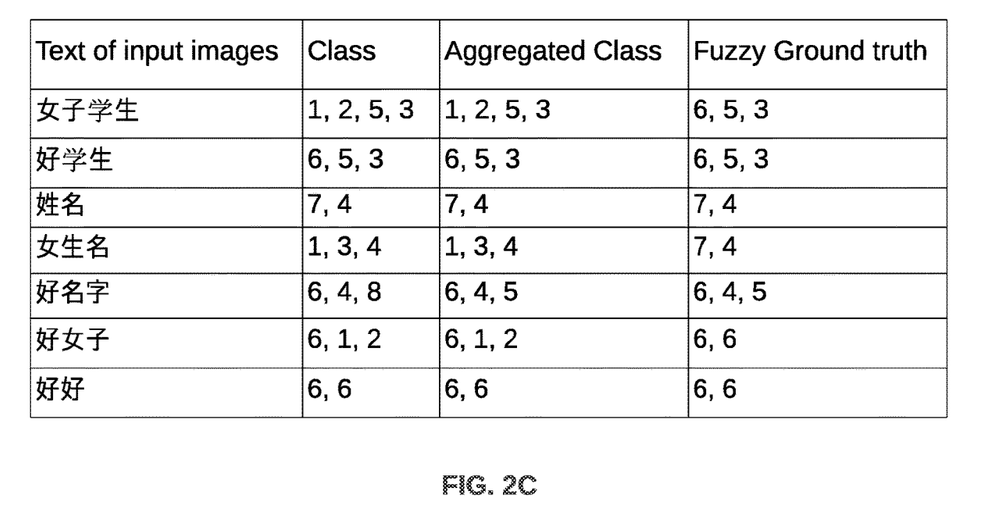
FIG. 2C shows a table with rows of character sequences in a first column, the table of FIG. 2A in a second column, the table of FIG. 2B in a third column, and a fuzzy ground truth for each of the character sequences in a fourth column.

FIG. 2C takes input characters which correspond to sequences of characters in FIG. 2A and treats the characters in three different ways. The first column (left-hand side) is the input image characters themselves, each row with its individual characters. These may be thought of as the ground truth for the image samples. In the second column, the individual characters are identified according to class as in FIG. 2A. These may be thought of as the ground truth as seen by an OCR model; in a sense, these may be thought of as tensors of one-hot vectors, as ordinarily skilled artisans will appreciate. In the third column, the individual characters are placed in the aggregated classes of FIG. 2B. The third column is largely like the second, except that in the third line from the bottom, instead of the last character being in class 8 (as in FIG. 2A), it is placed in aggregated class 5 (as in FIG. 2B). This third column may be thought of as an "intermediate ground truth". In the fourth column, all of the images are placed in aggregated classes constituting the "ground truth" as input into a fuzzy OCR model.

Looking more closely at FIG. 2C, in the first row there are four input characters, corresponding individually to classes 1, 2, 5, and 3 (second column), and to indexed aggregated classes 1, 2, 5, and 3 (third column). To obtain the fuzzy ground truth value in the fourth column, the first two characters in that group may be viewed as a single character or as two characters. Such a view corresponds to aggregated class 6. Accordingly, for the fuzzy ground truth, the four input characters correspond to aggregated classes 6, 5, and 3.

Similarly, looking at the next line, the three input characters correspond individually to classes 6, 5, and 3 (second column), and to indexed aggregated classes 6, 5, and 3 (third column). As it turns out, for the fuzzy ground truth, the input characters likewise correspond to aggregated classes 6, 5, and 3. For the next line, the two input characters correspond individually to classes 7 and 4 (second column), and to indexed aggregated classes 7 and 4 (third column). For the fuzzy ground truth, the two input characters also correspond to aggregated classes 7 and 4. Similar patterns may be seen readily for the remaining rows in the table of FIG. 2C by comparing the characters in the first column to the characters in the class columns of FIG. 2A, and to the aggregated class columns of FIG. 2B. In the input text line images of FIG. 2C, indices of 1, 2 and 1, 3 may be converted to 6 and 7 respectively. As a result, the OCR model may learn to recognize "女子学生" and "好学生", "姓名" and "女生名", "好女子" and "好好" as the same.

Figure 3A:
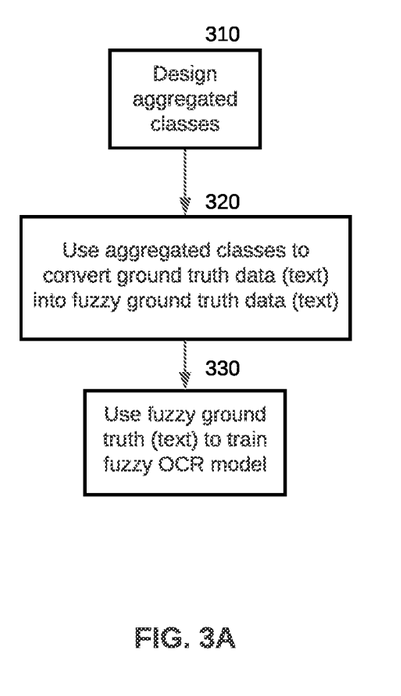
FIGS. 3A and 3B show high level flow charts for training a fuzzy OCR system and a language model according to an embodiment.
Figure 3B:
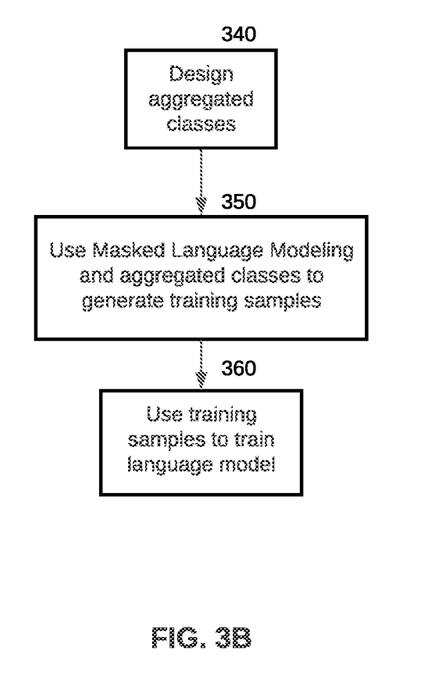

FIGS. 3A and 3B provide high level overviews of training a fuzzy OCR model and a language model according to embodiments. In FIG. 3A, at 310, aggregated classes of the type discussed above with respect to FIGS. 2B and 2C are designed. At 320, these aggregated classes may be used to convert ground truth data (text) to fuzzy ground truth data (text). In FIG. 3B, at 340, aggregated classes of the type discussed above with respect to FIGS. 2B and 2C are designed. In an embodiment, the designed aggregated classes resulting from 310 in FIG. 3A and 340 in FIG. 3B may be the same. At 350, in an embodiment masked language modeling may be used with the aggregated classes to generate training samples for the language model. At 360, the training samples then may be used to train the language model.

Figure 4A:
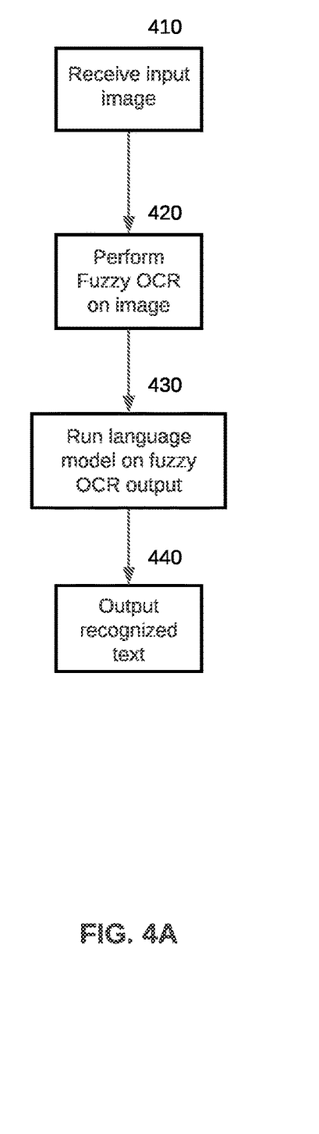
FIGS. 4A-4C show high level flow charts of a fuzzy OCR operation according to an embodiment.

FIG. 4A is a high level flowchart according to an embodiment. In FIG. 4A, at 410 an input image (which, as text, is actually a plurality of images) is received. At 420, fuzzy OCR is performed. As discussed further herein, as part of the performance of fuzzy OCR, each of the output classes becomes an aggregated class. As discussed earlier with respect to FIGS. 2B and 2C, each aggregated class may be a non-empty set of strings, wherein each string may be a single character, or a multiple character sequence. Each string is a possible transcription.

Before training a fuzzy OCR model, the ground truth of training samples needs to be converted to "fuzzy" ground truth. This conversion is a two-step process, as can be seen with reference to FIG. 2C. In a first step, an input text string may be mapped to a sequence of indices of aggregated classes. To enable interpretation of merged/separated characters, the sequence of indices may be mapped into an aggregated class that contains such sequence. After training, the fuzzy OCR model will give the correct aggregated class the highest probability, without deciding which string in the aggregated classes is the most probable one.

Looking again at FIG. 4A, after performing fuzzy OCR, at 430 a language model, which may be a neural language model of one of the types discussed herein, is run on the fuzzy OCR output to resolve which string is most probable. In this fashion, at 440 the recognized text may be output.

Figure 4B:
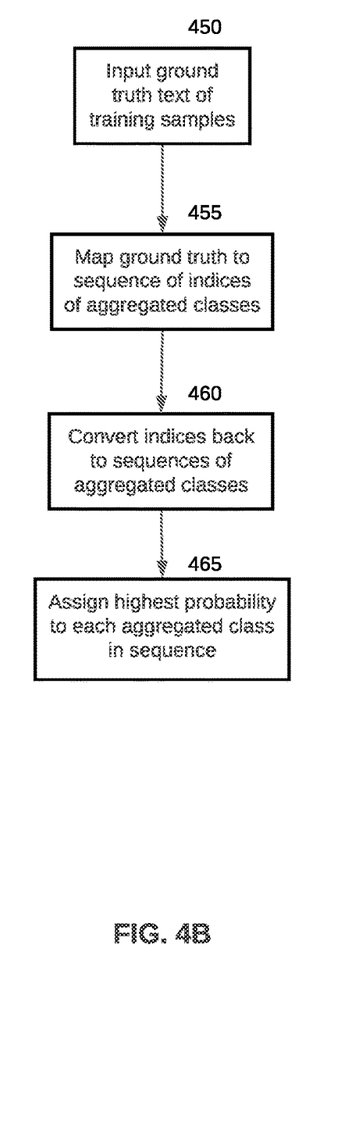

The foregoing training of the fuzzy OCR model also may be seen with reference to FIG. 4B. At 450, the ground truth of training samples may be input. At 455, the input ground truth text may be mapped to a sequence of indices of aggregated classes, as seen in FIGS. 2B and 2C. At 460, the indices may be converted back to a sequence of aggregated classes. At 465, the highest probability then may be assigned to each aggregated class of the sequence.

Figure 4C:
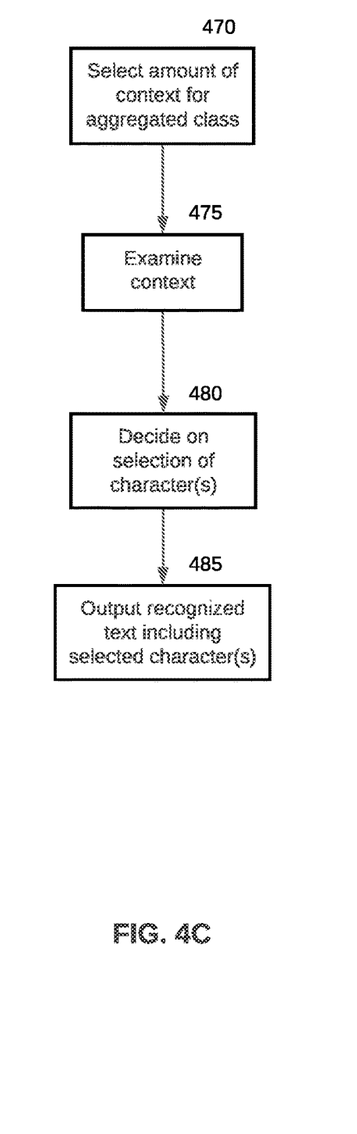

In an embodiment, the assignment of the highest probability at 465 in FIG. 4A can depend in large measure on visual information or appearance of the characters in an input image. To further disambiguate choices in aggregated classes, semantic context may be utilized. FIG. 4C is a flow chart focusing on that context in more detail, as part of the operation of a language model that uses the highest probability aggregated class from 465 in FIG. 4B to output recognized text. Recognizing that the highest probability assigned to an aggregated class does not necessarily make that aggregated class the one containing the correct answer, one or more words or sentences around the word in which the characters in the aggregated class appears may be examined to provide context. Accordingly, in FIG. 4C, at 470 an amount of context for the particular aggregated class from 465 in FIG. 4B may be selected. Part of the training of the neural network system that makes the final identification of the character may include prior determination of an amount of context that may be most likely to be sufficient to provide the correct character identification. At 475 the system examines the context. At 480, the system determines a selection of character(s) to be part of the recognized text. At 485, the recognized text is output, including the selected character(s).

In an embodiment, the aggregated output classes of a fuzzy OCR model may form a partition of the intended alphabet (hiragana, katakana, Kanji, or another alphabet) so that every character of the intended alphabet belongs to exactly one aggregated class.

Depending on the embodiment, aggregated classes that the fuzzy OCR system outputs may be obtained in any of a number of ways. For example, one or more dictionaries, or lists of potentially confused characters, may be consulted. It should be noted that this consultation does not resolve spacing between characters, whether horizontal (for text proceeding from left to right or right to left) or vertical (for text proceeding from top to bottom). In an embodiment, there may be a confusion matrix or error pattern of a traditional OCR model, trained on the same training data, which may be consulted. In an embodiment, the design of aggregated classes may be based on experience, to enable the system to discern, for example, whether adjacent characters should be merged or separated.

Ordinarily skilled artisans will appreciate that the number of aggregated classes can well depend on the quality of input image samples. Image sample quality can vary based on the quality of generation of the image, and/or the quality of the scanning of the image. The better the image sample quality, the more likely that aggregated classes will be more like output classes (i.e., non-aggregated classes), containing only a single character string, In selecting a model to be used for fuzzy OCR, depending on the embodiment, any encoder-decoder based neural architecture may be selected. This is because only the output classes are to be generalized. In an embodiment, one OCR model architecture may be a combination of a Convolutional Neural Network (CNN), a Bi-directional Long short-term memory (BILSTM), and Connectionist Temporal Classification (CTC) loss. In a more specific embodiment, to train the fuzzy OCR, ResNet or an Inception based CNN backbone may be used with a two-layer bi-directional LSTM with CTC loss. The training hyperparameters can be determined by empirically or by grid or random search. The training may be accomplished by updating weights using a loss calculation selected from the group consisting of ResNet, an inception based CNN backbone, a two-layer bi-directional LSTM, and connectionist temporal classification (CTC) loss.

In an embodiment, to train the LM, neural language models such as Bidirectional Encoder Representations from Transformers (BERT) can provide pre-training to follow. Keeping in mind that, in an embodiment, a goal is to have a LM to disambiguate candidate strings in an aggregated class, there are similarities to so-called masked language modeling, one of the pre-training tasks for BERT. In an embodiment, in masked language modeling a training data generator randomly chooses 15% of the token (that is, useful strings after tokenization, just characters for Japanese and Chinese) position. Depending on the embodiment, the masking may be more than 15%. In some embodiments, the amount of masking can approach or even exceed 40%. In an embodiment, the token may be replaced with 1) a mask token, for example, 80% of the time, or 2) a random token 10% of the time, or 3) remain unchanged 10% of the time. The system then may be trained to predict the masked token. In an embodiment, 1) may be modified to enable random selection of a token from the aggregated class.

During inference time of the trained LM, for each token that is an aggregated class containing more than one string (token), the LM is asked to predict the most probable string, which then is selected as the final recognition result.

In an embodiment, disambiguation of aggregated classes may be obtained by selecting the most probable string in each aggregated class, considering the context. Depending on the embodiment, the context may come from the language itself as well as application logic or rules of the document being input.

According to different embodiments, context can arise in any number of ways. In terms of subject matter, a non-exhaustive but exemplary list may include literature (including literature of different countries/regions), economics (including macro/microeconomics, etc.), finance, law, history, medicine, philosophy, politics, sciences (biology, physics, chemistry, astronomy, mathematics, etc.), engineering (electrical, civil, mechanical, structural, quality, value, etc.), sports (soccer, tennis, baseball, rugby, football, etc.), psychology/psychiatry and related disciplines, investing, computer science/programming, or religion/theology (including specific subareas for different particular religions). Ordinarily skilled artisans will appreciate that other disciplines or subdisciplines also can provide substantial context. From this non-exhaustive list, ordinarily skilled artisans will appreciate, for example, that the context that a patient record (medicine) provides will be different from the context that a sports article provides.

In addition to subject matter context per the examples above, different eras or historical periods may involve different words, sentences, and characters coming into play. Grammar, syntax, and usage may vary across the centuries. In an embodiment, then, training sets may comprise documents or portions of documents from one or more of those different eras or historical periods. In some instances, aspects of the invention may be applied usefully to different countries or regions of countries, in which different dialects and therefore possibly different grammars and syntaxes may come into play. Ordinarily skilled artisans will appreciate that other divisions and/or subdivisions also can provide substantial context.

Figure 5:
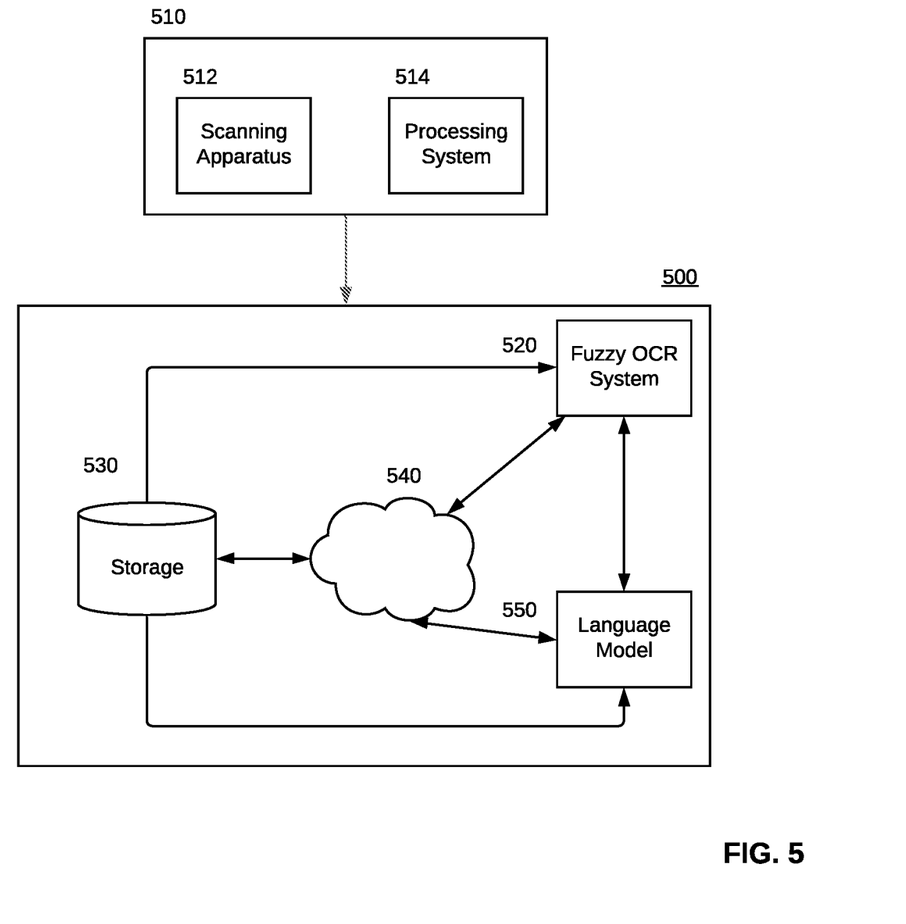
FIG. 5 shows a high level block diagram of structure of a character recognition system according to an embodiment.

FIG. 5 is a high level block diagram of a computing system 500 which, among other things, can accept scanned images from a scanning system 510 as inputs to perform OCR on those inputs. In an embodiment, scanning system 510 may include scanning apparatus 512 which may output scanned images directly to computing system 500, or may do so through processing system 514 which may be part of scanning system 510.

In an embodiment, Fuzzy OCR system 520, which may comprise a neural network of the types discussed above, may receive scanned images from scanning system 510. The scanned images may contain characters of a type which may have a number of visually similar characters. The fuzzy OCR system 520 also may receive data regarding aggregated classes of characters stored in non-volatile storage 530 and received either directly or via cloud or network 540. The fuzzy OCR system 520 will provide the aggregated class with the highest probability to language model 550, as discussed earlier. Language model 550, which may or may not be part of the fuzzy OCR system 520, may use the highest probability aggregated class of characters in conjunction with a sufficient portion of the scanned image from which the characters in the aggregated classes are taken to select the correct character or group of characters from an aggregated class. Where language model 550 is separate from fuzzy OCR system 520, language model 550 may communicate with fuzzy OCR 520 either directly or via cloud or network 540. Language model 550 may communicate with non-volatile storage 530 either directly or via cloud or network 540.

Non-volatile storage 530 may store training data and ground truth data, among other things. As indicated elsewhere herein, as a non-exhaustive list, the training data may comprise data from any number of subject areas, historical eras, and the like. Ordinarily skilled artisans will appreciate that there can be other types of training data.

Any or all of the processing system 514, fuzzy OCR system 520, and language model 550 may comprise one or more processors, which may be multi-core, multi-GPU processors; non-volatile storage to store one or more programs which the one or more processors run; and/or volatile storage which may receive the one or more programs from non-volatile storage to perform the processing described herein. T While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A computer-implemented method comprising:
responsive to an input scanned image, transcribing text from the image into a plurality of aggregated output classes;
performing neural network based fuzzy optical character recognition (OCR), providing fuzzy OCR output comprising a further plurality of aggregated output classes of visually similar characters, and identifying a most probable aggregated output class from the plurality of aggregated output classes;
using a neural network-based language model and the identified most probable aggregated output class, determining an amount of context in which to examine the identified most probable aggregated output class;
responsive to the determined amount of context, examining the context to determine which of the visually similar characters in the identified most probable aggregated output class should be output; and
responsive to the examining, outputting a selected one of the visually similar characters as recognized text.

2. The computer-implemented method of claim 1, wherein the portion of text is some or all of a sentence.

3. The computer-implemented method of claim 1, wherein the portion of text is some or all of a paragraph.

4. The computer-implemented method of claim 1, wherein the portion of text is a word in which the selected one of the visually similar characters appears.

5. The computer-implemented method of claim 1, wherein the neural network based OCR system and the neural network-based language model all are part of the same neural network.

6. The computer-implemented method of claim 1, further comprising designing the output classes by a method selected from the group consisting of consulting a dictionary or listing of visually similar characters, and consulting a confusion matrix of an existing OCR engine.

7. The computer-implemented method of claim 1, wherein the neural network-based OCR model is selected from the group consisting of a Convolutional Neural Network (CNN), a Bi-directional Long short-term memory (BiLSTM), and Connectionist Temporal Classification (CTC) loss, or a combination thereof.

8. The computer-implemented method of claim 7, wherein the neural network-based language model is trained by updating weights using cross-entropy loss calculation.

9. The computer-implemented method of claim 7 wherein the neural network-based OCR model is trained by updating weights using a loss calculation selected from the group consisting of ResNet, an inception based CNN backbone, a two-layer bi-directional LSTM, and connectionist temporal classification (CTC) loss.

10. The computer-implemented method of claim 1, wherein the visually similar characters are Japanese or Chinese characters.

11. A computer-implemented apparatus comprising:
apparatus to analyze an input scanned image; a neural network based fuzzy optical character recognition (OCR) system to: transcribe text from the image into a plurality of aggregated output classes; provide fuzzy OCR output comprising a further plurality of aggregated output classes of visually similar text characters, and identify a most probable aggregated output class from the plurality of aggregated output classes;
a neural network-based language model which uses the identified most probable aggregated output class to determine an amount of context in which to examine the identified most probable aggregated output class; responsive to the determined amount of context, examine the context to determine which of the visually similar characters in the identified most probable aggregated output class should be output; and responsive to examination of the context and, responsive to the examined context, output a selected one of the visually similar characters as recognized text.

12. The computer-implemented apparatus of claim 11, wherein the portion of text is some or all of a sentence.

13. The computer-implemented apparatus of claim 11, wherein the portion of text is some or all of a paragraph.

14. The computer-implemented apparatus of claim 11, wherein the portion of text is a word in which the selected one of the visually similar characters appears.

15. The computer-implemented apparatus of claim 11, wherein the neural network based OCR system and the neural network-based language model all are part of the same neural network.

16. The computer-implemented apparatus of claim 11, wherein the output classes are designed using a method selected from the group consisting of consulting a dictionary or listing of visually similar characters, and consulting a confusion matrix of an existing OCR engine.

17. The computer-implemented apparatus of claim 11, wherein the neural network-based OCR model is selected from the group consisting of a Convolutional Neural Network (CNN), a Bi-directional Long short-term memory (BiLSTM), and Connectionist Temporal Classification (CTC) loss, or a combination thereof.

18. The computer-implemented apparatus of claim 17, wherein the neural network-based language model is trained by updating weights using cross-entropy loss calculation.

19. The computer-implemented apparatus of claim 17, wherein the neural network-based OCR model is trained by updating weights using a loss calculation selected from the group consisting of ResNet, an inception based CNN backbone, a two-layer bi-directional LSTM, and connectionist temporal classification (CTC) loss.

20. The computer-implemented apparatus of claim 11, wherein the visually similar characters are Japanese or Chinese characters.

* * * * *